United States Patent
Tatzel et al.

(10) Patent No.: US 9,876,652 B2
(45) Date of Patent: Jan. 23, 2018

(54) AUTOMATIC CONFIGURATION OF CONTROL DEVICE USER INTERFACE IN A HOME AUTOMATION SYSTEM

(71) Applicant: Savant Systems, LLC, Hyannis, MA (US)

(72) Inventors: David W. Tatzel, West Yarmouth, MA (US); Arthur A. Jacobson, Centerville, MA (US); Nicholas J. Cipollo, Boston, MA (US); Jose J. Ronquillo Rodriguez, Mashpee, MA (US)

(73) Assignee: Savant Systems, LLC, Hyannis, MA (US)

( * ) Notice: Subject to any disclaimer, the term of this patent is extended or adjusted under 35 U.S.C. 154(b) by 693 days.

(21) Appl. No.: 14/282,734

(22) Filed: May 20, 2014

(65) Prior Publication Data

US 2015/0341184 A1    Nov. 26, 2015

(51) Int. Cl.

| | |
|---|---|
| *G06F 3/0484* | (2013.01) |
| *G06F 17/30* | (2006.01) |
| *H04L 12/28* | (2006.01) |
| *H04L 12/24* | (2006.01) |
| *G06F 3/14* | (2006.01) |
| *G06F 9/44* | (2006.01) |

(52) U.S. Cl.
CPC .......... *H04L 12/282* (2013.01); *G06F 3/0484* (2013.01); *G06F 3/14* (2013.01); *G06F 9/4443* (2013.01); *G06F 17/30* (2013.01); *G06F 17/30477* (2013.01); *H04L 12/28* (2013.01); *H04L 12/281* (2013.01); *H04L 41/22* (2013.01)

(58) Field of Classification Search
CPC ... G06F 3/0484; G06F 17/30; G06F 17/30477
USPC ......................................................... 715/771
See application file for complete search history.

(56) References Cited

U.S. PATENT DOCUMENTS

| | | | |
|---|---|---|---|
| 6,756,998 | B1 | 6/2004 | Bilger |
| 7,930,644 | B2 | 4/2011 | Silva et al. |
| 8,473,325 | B2 | 6/2013 | Barnhill, Jr. et al. |
| 2006/0080408 | A1 | 4/2006 | Istvan et al. |
| 2007/0112939 | A1 | 5/2007 | Wilson et al. |
| 2007/0142022 | A1 | 6/2007 | Madonna et al. |

(Continued)

OTHER PUBLICATIONS

U.S. Appl. No. 13/923,826, filed Jun. 21, 2013 by Robert Madonna et al. for a Configuration Connection Device, 1-28.

(Continued)

*Primary Examiner* — Andrea Leggett
(74) *Attorney, Agent, or Firm* — Cesari and McKenna, LLP (57) ABSTRACT

In one embodiment, a technique is provided for automatically generating a custom user interface (UI) of a control device usable to control a home automation system. A configuration database is maintained, for example, on a host controller, of the home automation system. The configuration database stores logical representations that describe a configuration. The configuration database is transferred (e.g., downloaded) to a control device. The control device accesses the configuration database for one or more of the logical representations, and translates returned information related to the one or more of the logical representations to UI element, using predefined mappings. The controll device then displays the UI elements as a custom UI.

20 Claims, 8 Drawing Sheets

(56) References Cited

U.S. PATENT DOCUMENTS

2008/0127063 A1* 5/2008 Silva .................. H04L 12/2809
717/107
2010/0283579 A1* 11/2010 Kraus ................ G07C 9/00944
340/5.7
2013/0283025 A1 10/2013 Madonna et al.

OTHER PUBLICATIONS

U.S. Appl. No. 14/190,984, filed Feb. 26, 2014 by Robert Madonna el al. for a User Generated Virtual Room-Based User Interface, 1-32.

* cited by examiner

| Rooms | | | | 310 |
|---|---|---|---|---|
| ID | Name (Unique) | | | |

| RoomGroups | | | 320 |
|---|---|---|---|
| ID | Name | | |

| Zones | | | | 330 |
|---|---|---|---|---|
| ID | Name | Type | | |

| RoomGroupMap | | | | 340 |
|---|---|---|---|---|
| ID | RoomID | GroupID | | |

| ZoneServiceMap | | | | 350 |
|---|---|---|---|---|
| ID | Zone | ServiceID | | |

| ZoneRoomMap | | | | 360 |
|---|---|---|---|---|
| ID | Zone | Room | | |

AUTOMATIC CONFIGURATION OF CONTROL DEVICE USER INTERFACE IN A HOME AUTOMATION SYSTEM

BACKGROUND

Technical Field

The present disclosure relates generally to home automation systems and more specifically to the user interfaces (UIs) of control devices used in home automation systems.

Background Information

Home automation systems are becoming increasingly popular in both residential and commercial buildings. Such systems may be capable of controlling, switching data between, and otherwise interacting with a wide variety of devices, including audio/video devices (A/V) devices, heating ventilation and cooling (HVAC) devices, security devices, energy conservation devices, communications devices, telephony devices, and/or other types of devices. Often, a user may indicate desired control to a home automation system utilizing one or more control devices, for example, mobile devices (such as smartphones or tablet computers), remote control units that include a display screen (e.g., a touch sensitive display screen) upon which a user interface (UI) is shown, desktop computers (e.g., personal computers (PCs)), etc.

Prior to users being able to utilize a home automation system, such systems typically require configuration. Further control devices used with such system may require custom UI creation. Typically, an installer (e.g., a paid technician) connects to the system and builds a configuration using specialized software. The installer may then use specialized software to build a custom UI and/or adapt existing UI templates to produce a UI usable on a control device for controlling the configuration. For example, an installer may manually define UI elements (e.g., buttons, sliders, menus, etc.) and the functions of those UI elements. Even when UI templates are available, installers often need to make significant modifications to them before they are appropriate for use on a control device. This sort of manual building of a custom UI by an installer may be referred to as "installer-authoring."

Installer-authoring of custom UIs for control devices has a number of shortcomings. Among other shortcomings, it is typically time consuming and error prone. The use of installer time generally adds to the overall cost of a home automation system, placing home automation beyond the reach of many consumers. Further, the potential for errors may lead to unreliability and user dissatisfaction with the home automation system.

Accordingly, there is a need for improved techniques for creation of custom UIs for control devices of home automation systems.

SUMMARY

In one embodiment, a technique is provided to automatically generate custom UIs for control devices of a home automation system utilizing easily-digestible data formats and translation abilities of a mobile application (app). After an installer has built a configuration of the home automation system in a configuration application, the configuration application constructs a configuration database (e.g., a relational database, such as a structured query language (SQL) database) that utilizes special logical representations to describe the configuration of the home automation system. The configuration database is transferred to (e.g., downloaded by) each control device, and may be encapsulated thereon by a control SDK. The control SDK, among other functionality, provides methods for querying the configuration database. A mobile app executing on the control device utilizes the control SDK to systematically query the configuration database, to retrieve information concerning the logical representations present and thereby the configuration of the home automation system. The mobile app then translates returned information to UI elements to create a custom UI of the mobile app, the translation using predefined mappings. The custom UI is displayed on the control device, for use by a user to control the home automation system.

Using such a technique, an installer need not author a custom UI for control devices used in the home automation system. The installer may simply configure the system. Upon a user activating a control device, the control device may obtain (e.g., download) the configuration database and automatically generate its own custom UI adapted to the configuration of the home automation system. Further, should the home automation system be reconfigured (e.g., devices added, operation of devices changed, etc.), an installer need not manually alter the custom UI to make use of the new functionality. A newer version of the configuration database may simply be obtained (e.g., download) onto each control device and used to automatically generate new custom UIs. As such, installer time (and thereby the overall cost of the home automation system), as well as the potential for introducing bugs due to human-error may be reduced.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings, of which.

DETAILED DESCRIPTION

An Example Home Automation System

Figure 1:
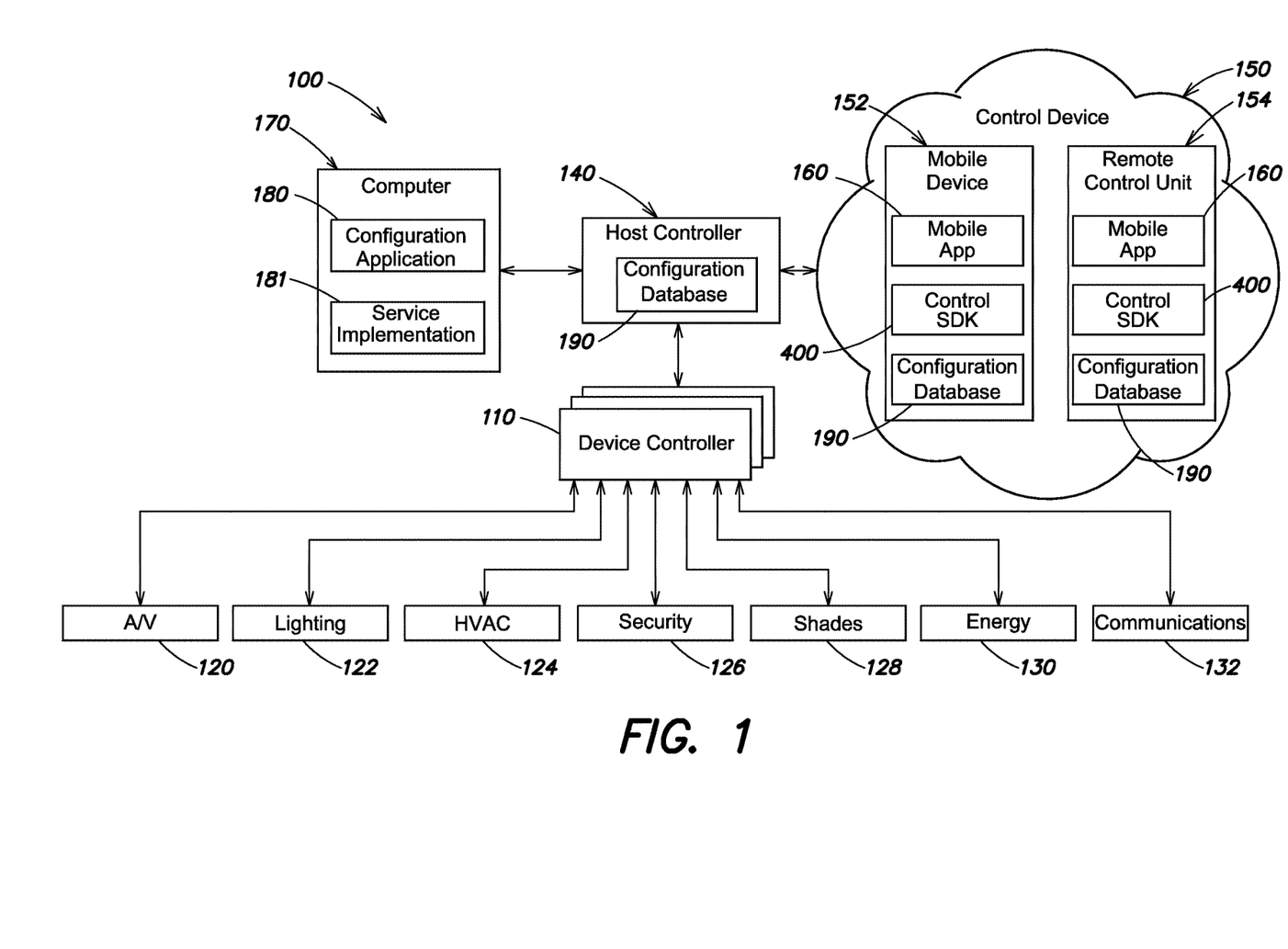
FIG. 1 is a block diagram of an example architecture of a home automation system operable to control devices about a structure.

FIG. 1 is a block diagram of an example architecture of a home automation system 100 operable to control devices about a structure (e.g., a home or commercial building). At the core of the system 100 are one or more device controllers 110 and a host controller 140. The device controllers 110 operate to switch signals between and provide low-level control to a variety of interconnected devices and/or subsystems 120-132. The host controller 140 controls and monitors operations of the device controllers 110, as well as provides user UI interpretation, system administration and monitoring, and/or other high-level control functions. Custom UIs for interacting with the home automation system 100 may be displayed to users on a variety of types of control devices 150. Further, the home automation system 100 may be configured by an installer (e.g., prior to initial use, or upon a change to the system) using a configuration application 180 that may be executed on a separate computer 170, that is, at least temporarily be coupled to the home automation system 100.

More specifically, the device controllers 110 may provide N×N switching, audio and video processing, device control, and other management functions to the various device and/or subsystems 120-132 that are present. The devices and/or subsystems 120-132 may include A/V devices 120 categorized into source devices that originate audio and/or video signals (such as cable boxes, digital video disc (DVD) players, media players, etc.), processing devices that manipulate audio and/or video signals (such as pre-amps, digital signal processors, amplifiers, etc.), and output devices that output audio and/or video signals (such as televisions, speakers, projectors, etc.). The devices and subsystems 120-132 may also include lighting devices 122, such as a lighting controller, keypads and/or lamp modules, and the like. In addition, heating ventilation and cooling (HVAC) devices 124 may be provided that include one or more thermostat processing units, thermostats, sensors and the like. Security devices may also be coupled to the device controllers 110, including motion sensors, security cameras, home healthcare sensors, related controllers, etc. Further, shade control devices 128 may be provided that include motor operated window shades, motor operated window blinds, related controllers, etc. Energy conservation devices 130 may be provided that include one or more energy monitors, current transformers, voltage sensors and the like. Still further, a communications subsystem 132 may be present that provides telephony, intercom and other related functions, utilizing one or more private branch exchanges (PBXs), gateways, handsets, and other units.

The host controller 140 may maintain a state center that stores feedback describing the operation of the devices and subsystems 120-132, and may provide state to the control device 150 that have registered to receive updates. Further, the host controller may receive control commands from control devices 150 indicating user input received in custom UIs shown on the control devices. The host controller 140 may interpreted such commands and send messages to the device controllers 110 to implement activities the user may desire to participate in.

Each control devices 150 may execute an application, for example a mobile application 160, that presents a custom UI to a user, and relays control commands back to the host controller 140, for example, over a wireless (e.g., wireless local area network (WLAN), or wired (e.g., Ethernet) connection. Control devices 150 may take a variety of forms, including mobile devices 152, remote control units 154, desktop computers (e.g., PCs), etc. As used herein, the term "mobile device" refers to a general purpose electronic device that executes a general-purpose operating system and is adapted to be transported on one's person. Devices such as tablet computers (e.g., the iPad® tablet running an iOS® operating system) and smartphones (e.g., the iPhone® smartphone running an iOS® operating system or an Android® smartphone running an Android® operating system) are considered mobile devices. Desktop computers would generally not be considered mobile devices. As used herein, the term "remote control unit" refers to a portable special-purposes electronic device that is configured to control a home automation system, or a portion thereof. Typically a remote control unit is not suited for general-purpose operation, and is instead adapted to operate with a one or more types of a home automation systems.

Regardless of their type, control devices 150 typically include a processor configured to execute software and manipulate data from data structures, and a memory including storage locations for storing the software and the data structures. Further, control devices 150 typically include a display screen (e.g., a touch sensitive display screen), for example, upon which the custom UI is shown. Control devices may also include a variety of other types of hardware, including a portable power source (e.g., a battery), a wireless communications interface, input devices (e.g., buttons, a camera, an orientation sensor, etc.), and the like.

As part of the initial installation of the home automation system 100, or reconfiguration of the system, an installer may build a configuration of the system by defining the capabilities and interconnections between devices present in the system. A computer 170 executing a configuration application 180 may, at least temporary, be coupled to the home automation system 100, and used by the installer. One example configuration application 180 that may be employed is the RacePoint Blueprint™ home automation software that provides a graphical programming environment for configuration of home automation systems. Using such an application, the installer may select representations of devices having corresponding profiles, place the representations in a workspace, and use a drawing tool to draw connections among the representations, as well as other operations, to build the configuration. From the built configuration the configuration application 180 may generate a "service implementation" 181. A "service implementation" is a machine readable markup language representation (e.g., an Extensible Markup Language (XML) representation) of the configuration of a home automation system.

An Example of Automated Generation of Custom UIs for Control Devices

Figure 4:
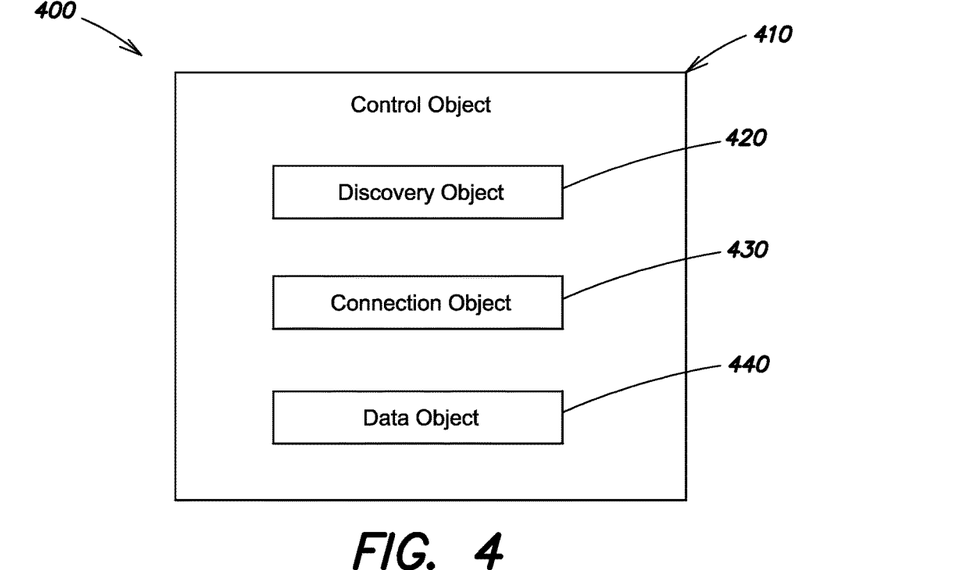
FIG. 4 is a block diagram of an example control software development kit (SDK)

In one embodiment, a technique is provided to automatically generate custom UIs for control devices 150 of the home automation system 100. A conversion engine (e.g., of the configuration application 180) may convert a service implementation 181 into a configuration database (e.g., a relational database such as a structured query language (SQL) database) 190, a copy of which may also be maintained on the host controller 140. The configuration database utilizes special logical representations to describe the configuration of the home automation system. To produce a custom UI on a given control device 150, the configuration database is transferred to (e.g., downloaded by) the control device and encapsulated by a control SDK 400. The control SDK 400, among other functionality, provides methods for querying the configuration database 190. A mobile app 160 executing on the control device utilizes the control SDK 400 to systematically query the configuration database 190, to retrieve information concerning the logical representations present and thereby the configuration of the home automation system 100. The mobile app 160 then translates returned information to UI elements to create a custom UI of the mobile app 160, the translation using predefined mappings. The custom UI is displayed on the control device 150, for use by a user to control the home automation system 100.

The logical representations employed within the configuration database 190 may include "rooms", "room groups", "components", "services", "requests", "workflows", "environmental services", "entities", and "zones", among others. In this context, a "room" refers to a logical representation of a portion of a structure in which a user may participate in one or more provided home automation activities. A room may correspond to a physical room within the structure or another region of space. For example, a user may participate in an activity of watching cable television (a "Cable TV" activity). Devices that are used to realize the activity may or may not be located in the portion of the structure represented by the room. For example, certain devices may be located in a central location (e.g., a rack room) and remotely signal into the portion of the structure.

Figure 2A:
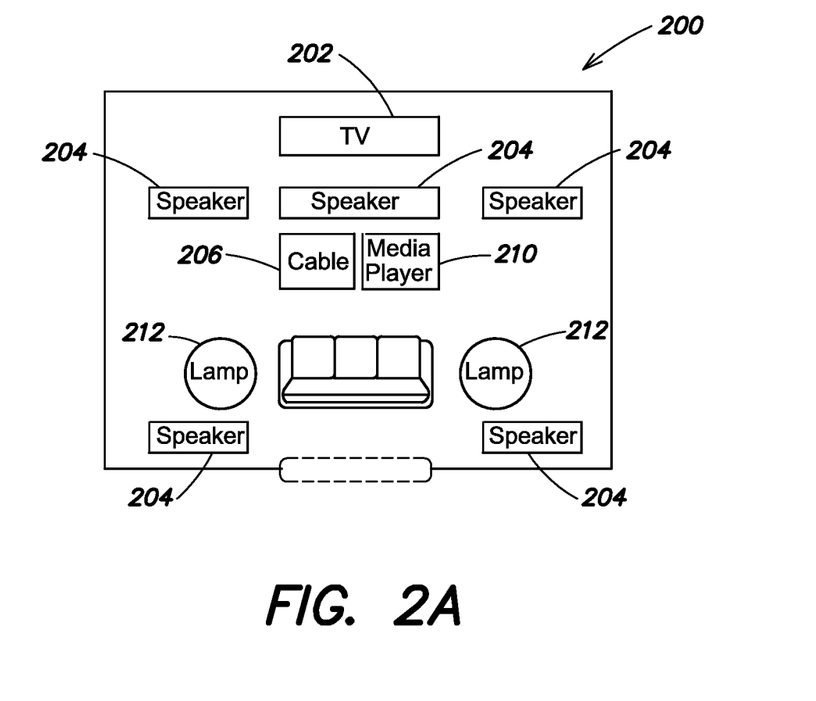
FIG. 2A is a diagram illustrating a portion of a structure represented by an example room.

FIG. 2A is a diagram 200 illustrating a portion of a structure represented by an example room. The example room 200 roughly corresponds to a physical living room within the structure, and includes devices such as a television 202, speakers 204, a cable box 206, a digital media player 210, and lighting fixtures 212, which may allow a user to participate in various activities within the room 200.

A "room group" refers to a logical representation of a set of rooms. Room groups may be based on physical proximity (e.g., being on the same floor of a structure), functional similarity, or other motivations.

A "component" refers to a logical representation of a device associated with a room. A "component" may be associated with a profile, e.g., a machine readable markup language (e.g., XML) description of the device's capabilities and input/output (I/O) interfaces.

A "service" refers to a logical representation of an activity a user can participate in. Generally, a service corresponds to one or more unique paths between devices that implement a set of functionality (e.g., audio and video paths from source devices to output devices). A service often defines a list of commands and state feedback which a control device 150 may use.

Figure 2B:
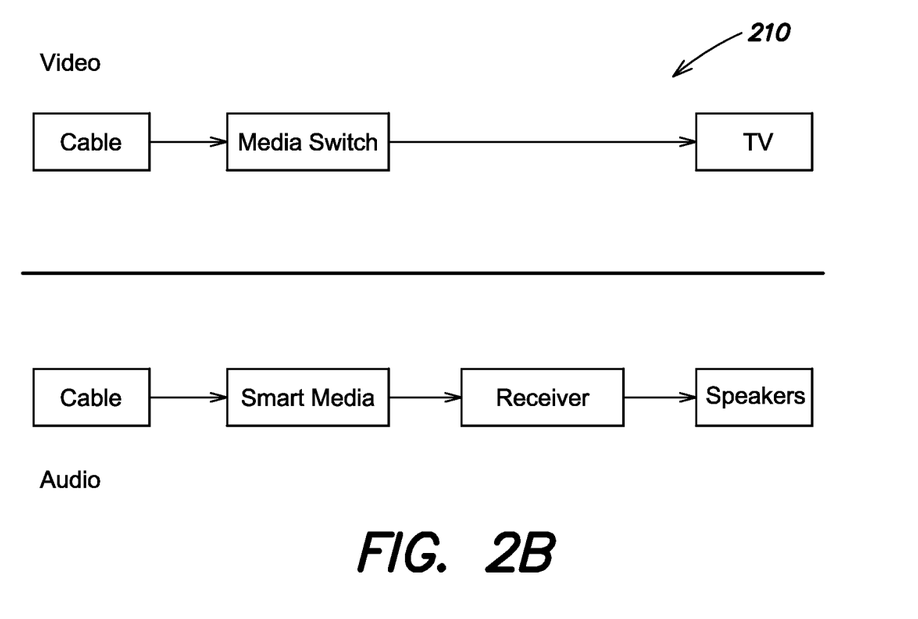
FIG. 2B is a diagram illustrating an example service that may be associated with the room of FIG. 2A.

FIG. 2B is a diagram 210 illustrating an example service that may be associated with the room of FIG. 2A. The example service may be a "Cable TV" service that utilizes the cable box, television and speakers shown in FIG. 2A, as well as a media switch, and receiver (not shown). A video path of the example service passes between the cable box, the media switch, and the television, while an audio path of the example service passes between the cable box, the media switch, the receiver and the speakers.

A "request" (or "service request") refers to a logical representation of a command supported by a service. For example, a request of the above discussed "Cable TV" service may be "channel up", "channel down", "menu", etc.

Further, a "workflow" refers to a logical representation of sequential actions that are performed by devices to implement a command of a service. Workflows may be standardized, or may be customized to include custom actions particular to an individual home automation system 100.

Figure 2C:
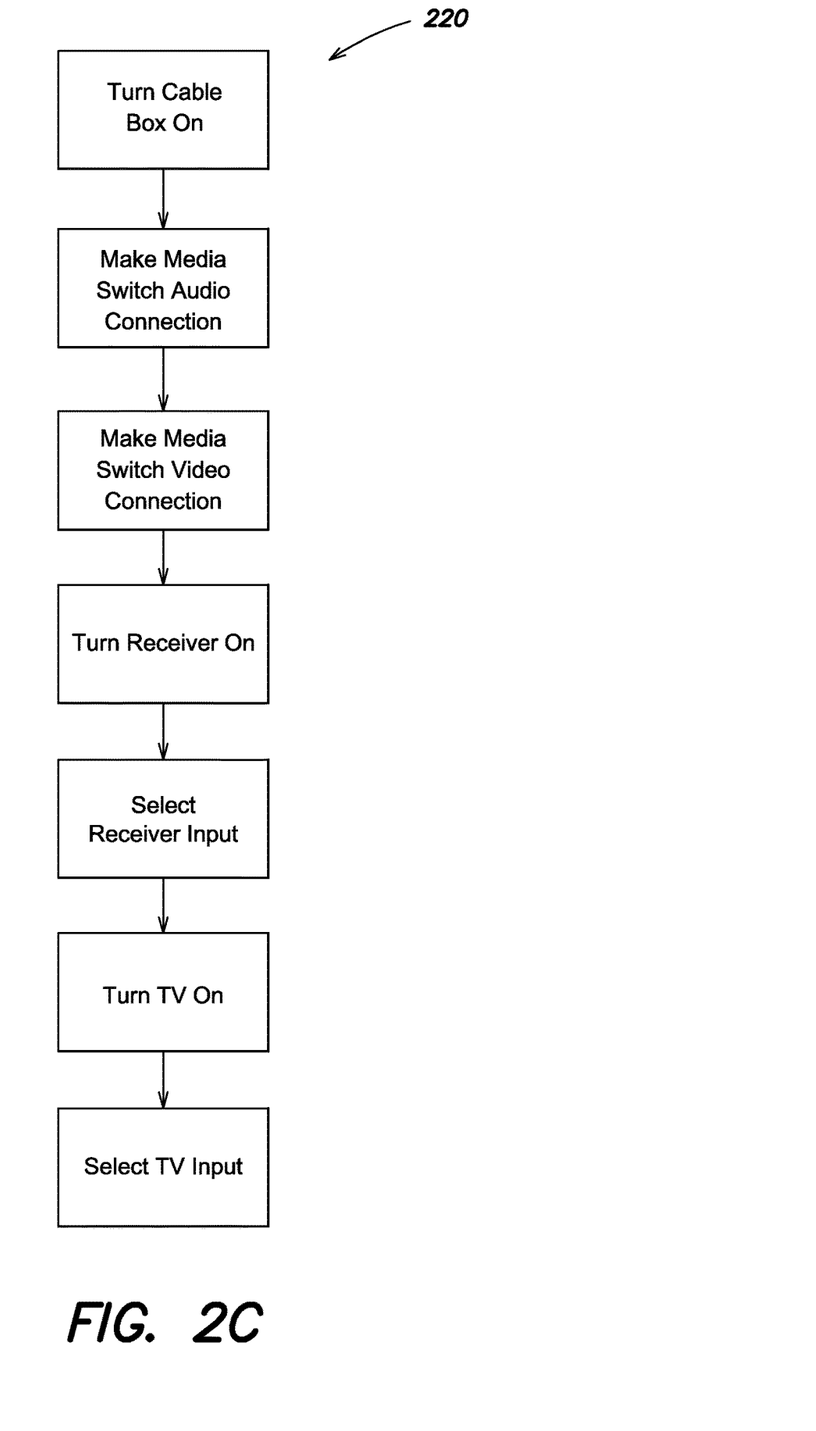
FIG. 2C is a diagram illustrating an example workflow that may be used in the example service of FIG. 2B.

FIG. 2C is a diagram 220 illustrating an example workflow that may be used in the example service of FIG. 2B. The example workflow may be a "Cable Box Power On" workflow used by the above discussed example "Cable TV" service. The example workflow includes a sequence of actions that turn on the cable box, make an internal audio connection in a media switch, make an internal video connection in the media switch, turn on a receiver, select an input on the receiver, turn on a television, and select an input on the television.

In addition, an "environmental service" is a special type of service that logically represents non-A/V activities. Example an environmental service may relate to lighting, shades, HVAC control, security, or other sorts of control.

Further, an "Entity" (or "environmental entity") refer to a logical representation of a controllable device that provides an environmental service. For example, an entity of a lighting service may represent a dimmer, switch, or other lighting control device; an entity for a shades service may represent a motor operated window shade, blind or other controllable window covering; likewise, an entity for an HVAC service may represent a thermostat or other HVAC device.

Finally, "zones" refer to a logical representation of a set of home automation system functionality. Several different types of zones may be employed. A "control zone" may organize functionality in terms of a group of contained services. An "environmental zone" may organize functionality in terms of a portion of a structure affected by a particular environmental service. Further, a "UI zone" may organize functionality in terms of what is to be displayed together to a user in a UI. Zones may be simultaneously of multiple types. For example, a given zone may be both a control zone and a UI zone. Further, zones may have a hierarchical relationship with each other.

Figure 2D:
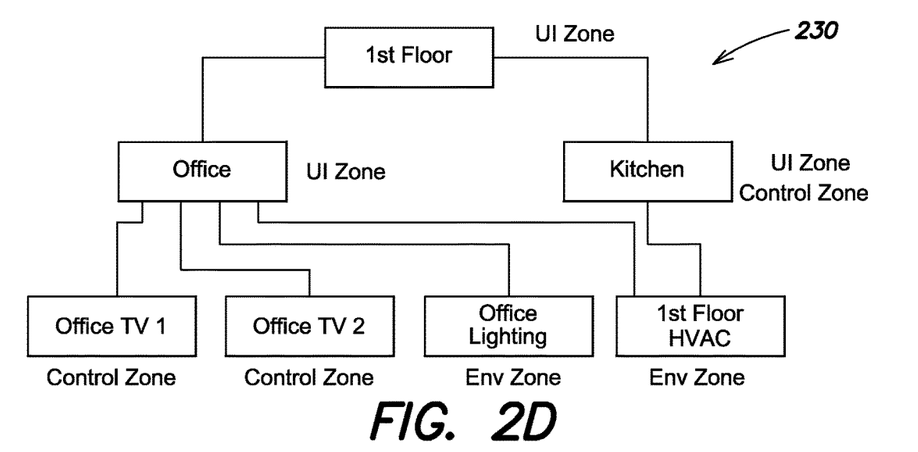
FIG. 2D is a diagram illustrating an example hierarchy of zones.

FIG. 2D is a diagram 230 illustrating an example hierarchy of zones. In this example, a UI Zone "$1^{st}$ Floor" includes a UI zone "Office" and a zone "Kitchen" that is both a control zone and a UI zone. The UI zone "Office" includes a control zone "Office TV1", a second control zone "Office TV2", an Environmental Zone "Office Lighting" and an environmental zone "$1^{st}$ Floor HVAC". Likewise, in this example, the zone "Kitchen" may include the environmental zone "$1^{st}$ Floor HVAC."

Figure 3:
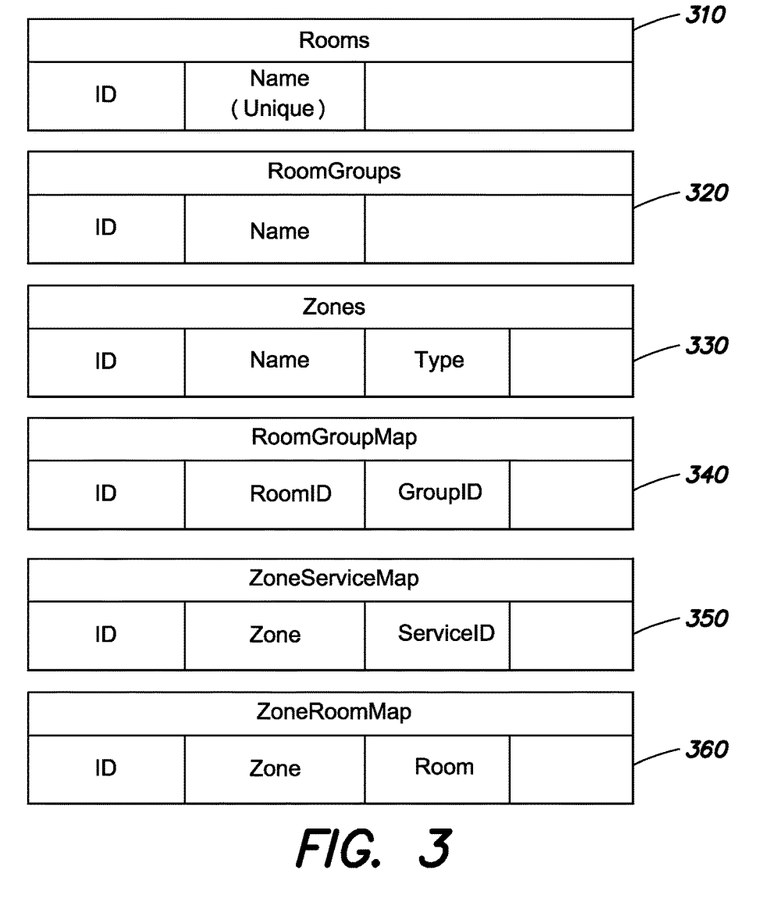
FIG. 3 is a diagram of a series of tables that are maintained as part of an example configuration database.

Information describing the logical representation may be maintained within the configuration database 190. FIG. 3 is diagram of a series of tables that are maintained as part of an example configuration database 190. A "rooms" table 310 may store data describing rooms, and include an identifier (ID) that serves as a primary key, and a unique room name. A "room groups" table 320 may store data describing room groups, and include an ID that serves as a primary key, and a group name. A "zones" table 330 may store data describing zones, and include an ID that serves as a primary key, and a zone name, and a type of the zone. A "room group map" table 340 may store an explicit mapping of rooms to rooms groups, and include an ID that serves as a primary key, a room ID that references a room from the rooms table 310, and a group ID that references a group of the room groups table 320. A "zone service map" table 350 may store an explicit mapping of zones to services, and include an ID that serves as a primary key, a zone name, and a service ID that references a service stored in a "services" table (not shown). Still further, a "zone room map" table 360 may store an explicit mapping of zones to rooms, and include an ID that serves as a primary key, a zone name, and a room ID that references a room stored in the rooms table 310. It should be understood that the configuration database 190 may also include a large number of other tables, and that tables 310-360 are merely illustrative of the type of arrangement of data that may be employed.

A copy of the configuration database 190 may be maintained on the host controller 140, and transferred (e.g., downloaded) to a control device 150 when the control SDK 400 on the control device 150 detects the version on the configuration database 190 is newer than one already present on the control device 150 (or no configuration database is present on the control device 150). The control SDK 400 may further encapsulate the copy of the configuration database 190, thereby providing an interface for querying it.

FIG. 4 is a block diagram of an example control SDK 400. A control object 410 may operate as a high level object, and include other objects of the SDK 400. A discovery object 420 is configured to find home automation systems on a local network and, for example, identify information about them such as a unique ID (UID) and an address. A connection object 430 is configured to connect to a designated home automation system 100, for example, using the UID or address, and handle such tasks as tracking connection status, managing authentication and user lists, pausing and resuming connections, and the like. The connection object 430 may be responsible for downloading the configuration database 190 to the control device 150 when it is determined that the host controller 140 includes a newer version than already present on the control device 150 (or no configuration database is present). Additionally, the connection object 430 may send messages to the host controller 140 as part of ongoing control of the home automation system, including sending service requests, on-screen display (OSD) commands, media request, etc. Similarly, the connection object 430 may receive state information from the host controller 140 during ongoing operation of the home automation system, for example, state feedback for system states the control device 150 has registered to receive.

A data object 440 is configured to encapsulate the configuration database 190 on the control device 150 and provide methods to support a variety of queries. A "get room groups" method may be provided to obtain all room groups. A "get rooms" method may be provided to obtain rooms that are associated with a specified room group. Further, a "get services" method may be provided to determine offered services that are associated with a specified room. Likewise, a "get requests" method may be provided to obtain requests that are associated with a specified service. Requests may be filtered to return only those that can be enabled. A "get zones" method may be provided to obtain zones that are associated with a service. Still further, a "get entities" method may be provided to obtain entities associated with a specified room, service and zone.

Figure 5A:
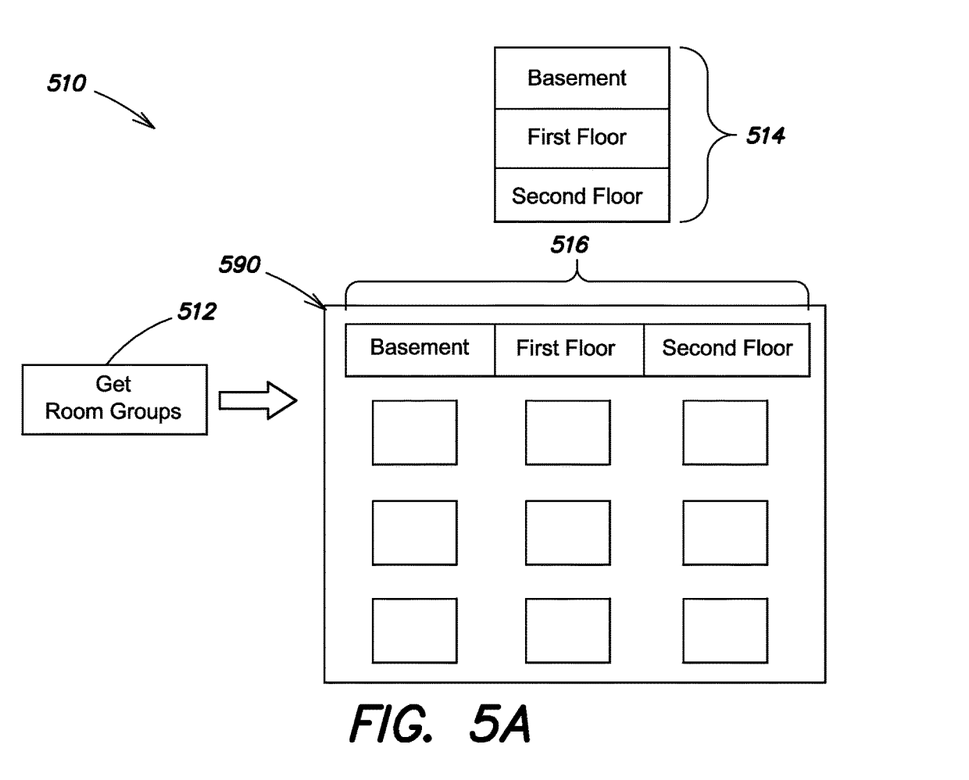
FIG. 5A is a diagram illustrating use by a mobile app of an example "get room groups" method of the control SDK to obtain room groups, and translation of the room groups into UI elements of a custom UI of the mobile app.

The mobile app 160 executing on the control device 150 may utilize the control SDK 400, and the methods provided by the data object 440 thereof, to systematically query the configuration database 190, to retrieve information concerning the logical representations present, and thereby the configuration of the home automation system 100. The mobile app 160 then translates the returned information to UI elements using predefined mappings FIG. 5A is a diagram 510 illustrating use by the mobile app 160 of an example "get room groups" method 512 of the control SDK 400 to obtain room groups 514, and translation of the room groups into UI elements 516 of a custom UI 590 of the mobile app. In this example the "get room groups" method 512 returns three room groups 514, named "Basement", "First Floor", and "Second Floor". The mobile app 160 translates the returned room groups into UI elements (e.g., buttons) 516, labeled "Basement", "First Floor", and "Second Floor", located in a first predetermined portion of a page of s custom UI 590 of the mobile app 160. The UI elements 516 are user-selectable (e.g., by touch) to cause the display of rooms that are members of the respective room group.

Figure 5B:
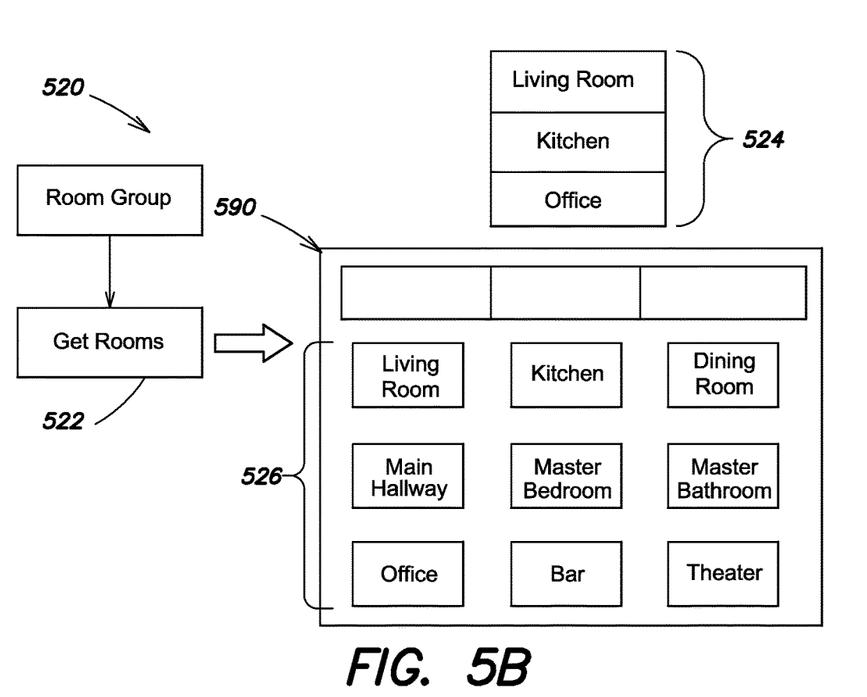
FIG. 5B is a diagram illustrating use by the mobile app of an example "get rooms" method of the control SDK to obtain rooms, and translation of the rooms into elements of the custom UI.

FIG. 5B is a diagram 520 illustrating use by the mobile app 160 of an example "get rooms" method 522 of the control SDK 400 to obtain rooms 524, and translation of the rooms into UI elements 526 of the custom UI 590. The "get rooms" method 522 may take as an argument a room group. In this example, the "get room groups" method 522 is provided as an argument the room group of "First Floor", and returns rooms 524 named "Living Room", "Kitchen", "Office", etc. The mobile app 160 translates these the returned rooms into UI elements (e.g., buttons) 526, labeled "Living Room", "Kitchen", "Office", etc., that are located in a second predetermined portion of the same page of the custom UI 590 of the mobile app 160. The UI elements 526 are user-selectable to cause the display of services that are offered.

Figure 5C:
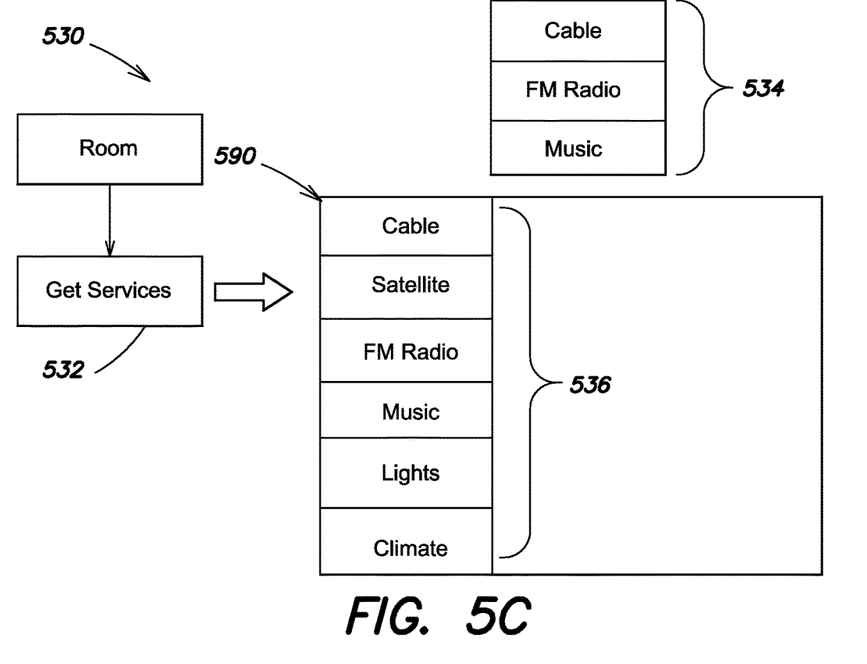
FIG. 5C is a diagram illustrating use by the mobile app of an example "get services" method of the control SDK to obtain services, and translation of the services into UI elements of the custom UI.

FIG. 5C is a diagram 530 illustrating use by the mobile app 160 of an example "get services" method 532 of the control SDK 400 to obtain services 534, and translation of the services into UI elements 536 of the custom UI 590. The "get services" method 532 may take as an argument a room. In this example, the "get services" method 532 is provided the argument of "Living Room", and returns services 534 named "Cable", "FM Radio", "Music", etc. The mobile app 160 translates the returned services into UI elements (e.g., buttons) 536, labeled "Cable", "FM Radio", "Music", etc., located in a predetermined portion of another page of the custom UI 590 of the mobile app 160. The UI elements 536 are user-selectable to cause the display of commands related to the respective service.

Figure 5D:
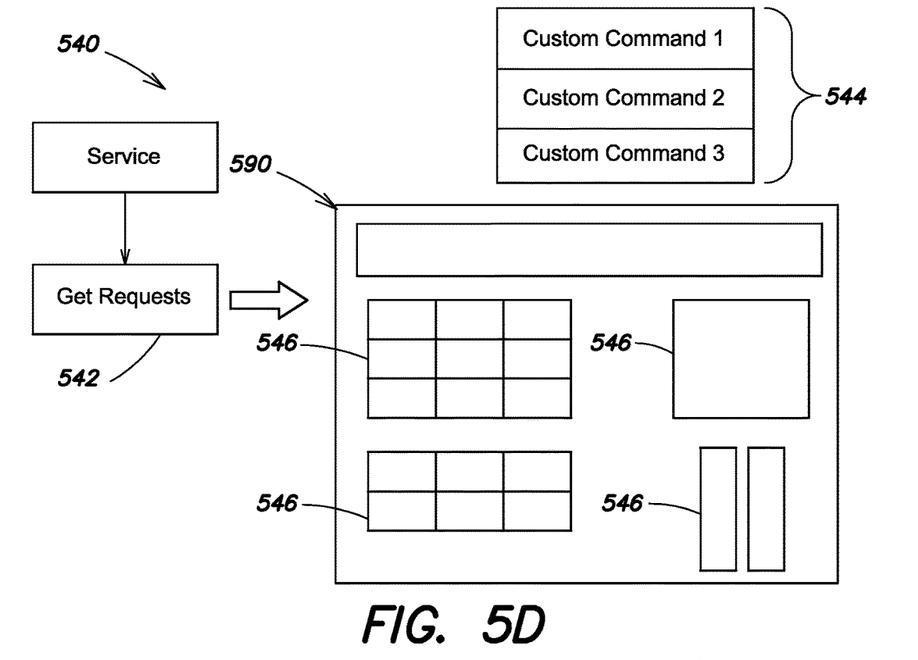
FIG. 5D is a diagram illustrating use by the mobile app of an example "get requests" method of the control SDK to obtain requests, and translation of the requests into UI elements the custom UI.

FIG. 5D is a diagram 540 illustrating use by the mobile app 160 of a "get requests" method 542 of the control SDK 400 to obtain requests 544, and translation of the requests into UI elements 546 of the custom UI 590. The "get requests" method 542 may take as an argument a service. In this example, the get requests method 542 is provided the argument of "Cable", and returns requests related to controlling a cable television viewing activity. The mobile app 160 translates the returned requests into UI elements (e.g., buttons, sliders, menus, etc.) 546 representing commands located on another page of the custom UI 590 of the mobile app 160. The UI elements 546 are user-selectable to trigger the related commands.

Figure 5E:
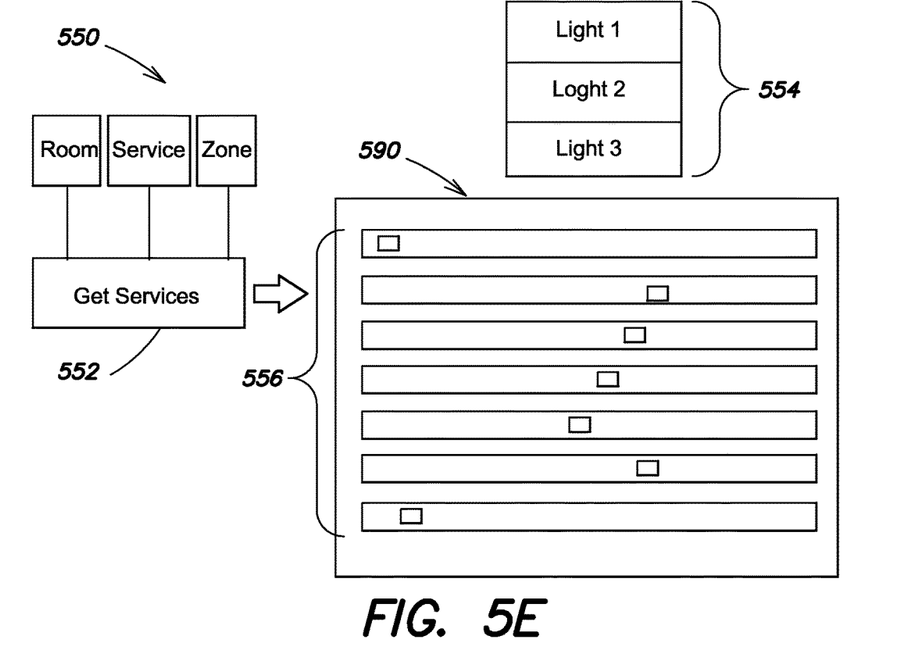
FIG. 5E is a diagram illustrating use by the mobile app of an example "get entities" method of the control SDK to obtain entities and translation of the entities into UI elements of the custom UI.

FIG. 5E is a diagram 550 illustrating use by the mobile app 160 of an example "get entities" method 552 of the control SDK 400 to obtain entities 554, and translation by the mobile app 160 of the entities into UI elements 556 of a UI 590. The "get entities" method 552 may take as arguments a room, a service and a zone, and returns entities. The mobile app 160 translates the returned entities into UI elements (e.g., sliders, buttons, knobs etc.) 556 usable to control the related entity. The UI elements may be displayed on yet another page of the custom UI 590 of the mobile app 160. The UI elements 556 are user-selectable to indicated desired control of the related entities.

Figure 6:
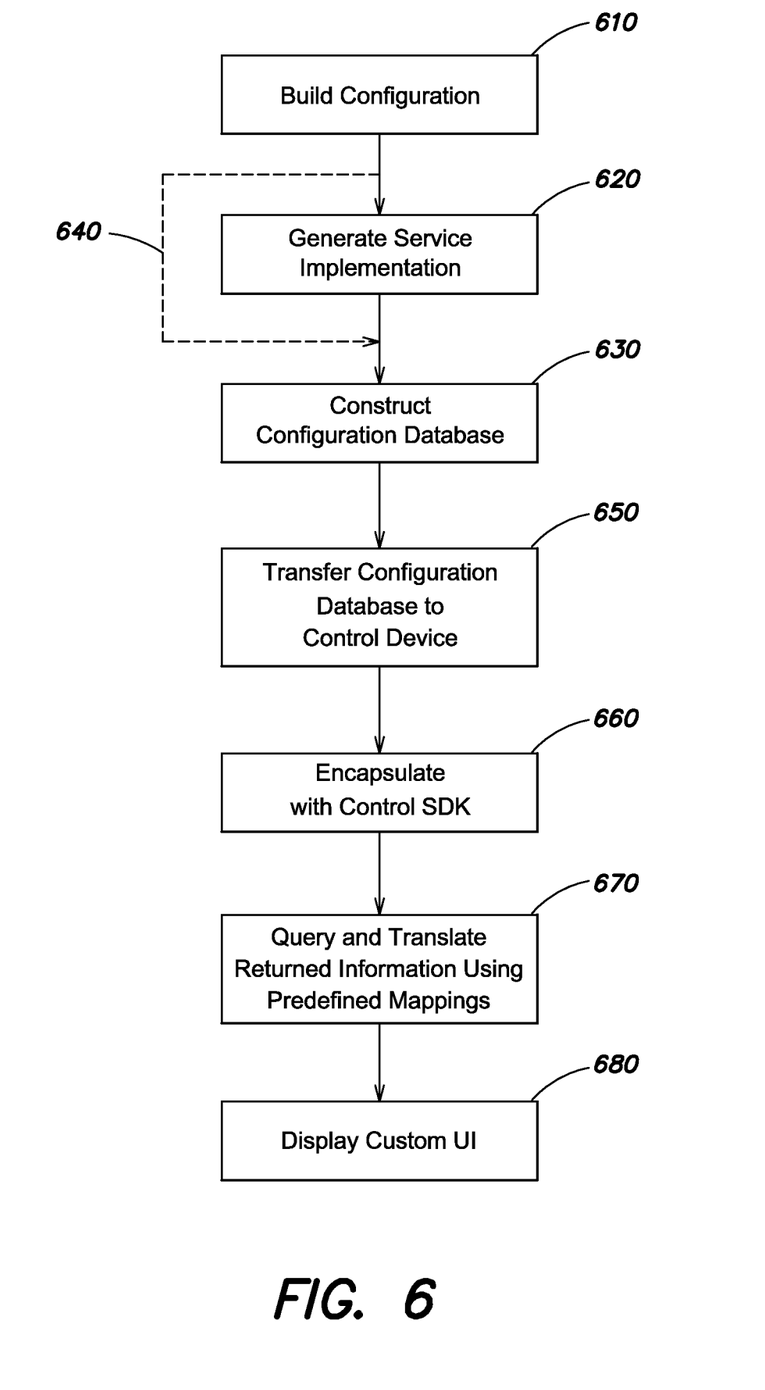
FIG. 6 is a flow diagram of an example sequence of steps for automatic generation of custom UIs.

FIG. 6 is a flow diagram of an example sequence of steps 600 for automatic generation of custom UIs. At step 610, in response to input from an installer, a configuration application 180 executing on a computer 170 builds a configuration of a home automation system 100. At step 620, the configuration application 180 generates a service implementation 181. At step 630, the configuration application 180 (or a separate software process) constructs a configuration database 190 that employs the above discussed logical representations, e.g., by translating the service implementation. Alternatively, the configuration database 190 may be directly constructed from the configuration built within the configuration application 180, absent the intermediary step 620 of generation of a service implementation, as shown by alternate pathway 640.

At step 650, the configuration database 190, or a portion thereof, is transferred (e.g., downloaded) to a control device 150. The transfer may occur from a host controller 110 where the configuration database 190 is maintained, and be in response a determination that a newer version of the configuration is available (or no configuration database is present on the control device 150). At step 660, the configuration database 190 is encapsulated on the control device 150 by a control SDK 400 that provides an interface for querying the configuration database 190. At step 670, a mobile app 160 executing on the control device 150 utilizes the control SDK 400 to query the database and translate returned information using predefined mappings to UI elements of a custom UI of the mobile app 160. At step 680, the custom UI is displayed on the control device 150, permitting a user of the control device to control the home automation system 100.

It should be understood that various adaptations and modifications may be made within the spirit and scope of the embodiments discussed herein. While some of the embodiments involve a home automation system that is capable of A/V control, lighting control, HVAC control, and other types of control, it should be understood that the techniques may be applicable more limited systems that, for example, may be controlling only a single type of device (e.g., only A/V devices, only lighting devices, etc.). While some of the embodiments utilize a mobile app 160 to perform various ones of the operations described above, it should be understood that the operations of the mobile app 160 may be implemented other software and/or hardware. For example, operations may be performed by client-side or server-side web code in connection with a web-based user interface. Similarly, operations may be performed by a personal computer (PC) based application. Further, it should be understood that in different embodiments software may be executed on different hardware devices than as shown above.

In general, many of the techniques may be alternatively implemented in software, in hardware, or various combinations thereof. Software implementations may include machine-executable instructions (e.g., computer-executable instructions) stored in a non-transitory machine-readable medium (e.g., a non-transitory computer-readable medium), such as a volatile or persistent memory, a hard-disk, a compact disk (CD), or other tangible medium. Hardware implementations may include configured processors, logic circuits, application specific integrated circuits, and/or other types of hardware components. Further, combined software/hardware implementations may include both computer-executable instructions stored in a non-transitory computer-readable medium, as well as one or more hardware components, for example, processors, memories, etc. In general, it should be understood that the above descriptions are meant to be taken only by way of example.

What is claimed is:

1. A method for automatically generating a custom user interface (UI) of a control device usable to control a home automation system, comprising:
   maintaining a configuration database that stores logical representations that describe a configuration of the home automation system, the configuration representative of capabilities of, and interconnections, between devices present within a particular structure;
   transferring the configuration database to a control device;
   querying, by the control device, the configuration database for one or more of the logical representations;
   translating returned information from the configuration database related to the one or more of the logical representations to UI elements using predefined mappings of logical representations to UI elements to automatically generate the custom UI; and
   displaying the UI elements on a display screen of the control device as part of the custom UI, the UI elements of the custom UI operable to control the home automation system.

2. The method of claim 1, further comprising:
   encapsulating the configuration database with a control software development kit (SDK); and
   wherein the querying utilizes the control SDK to query the encapsulated configuration database.

3. The method of claim 1, wherein the maintaining maintains the configuration database on a host controller of the home automation system, and the transferring transfers the configuration database from the host controller to the control device in response to a version of the configuration database on the host controller being newer than any version of the configuration database on the control device.

4. The method of claim 3, further comprising:
   building the configuration in response to input by an installer in a configuration application executing on a computer coupled to the host controller.

5. The method of claim 4, wherein the configuration application provides a graphical programming environment, and the input by the installer comprises:
   selecting representations of devices having corresponding profiles;
   placing the representations in a workspace; and
   using a drawing tool to draw connections among the representations.

6. The method of claim 4, further comprising:
   generating, by the configuration application executing on the computer, a service implementation based on the configuration; and
   constructing the configuration database by translating the service implementation.

7. The method of claim 1, wherein the one or more of the logical representations include room groups, rooms, services, requests, or entities.

8. The method of claim 1, wherein the logical representations include UI zones.

9. The method of claim 1, wherein the control device is a mobile device executing a mobile application (app).

10. The method of claim 1, wherein the control device is a remote control unit.

11. A control device that automatically generates as a custom user interface (UI) usable to control a home automation system:
- a display screen;
- a processor; and
- a memory coupled to the processor and configured to store a configuration database that includes logical representations that describe a configuration of the home automation system that is unique to the capabilities of, and interconnections, between devices within a particular structure, a control software development kit (SDK) that encapsulates the configuration database, and a mobile application (app) that when executed is operable to:
  - utilize the control SDK to query the encapsulated configuration database,
  - translate information from the configuration database related to the logical representations returned from the query to UI elements using predefined mappings to automatically generate the custom UI;
  - display the UI elements to a user on the display screen as part of the custom UI, the UI elements of the custom UI operable by a user to control the home automation system.

12. The control device of claim 11, wherein the mobile app when executed is further operable to:
- obtain the configuration database from a host controller in response to a version of the configuration database on the host controller being newer than any version of the configuration database on the control device.

13. The control device of claim 11, wherein the logical representations include room groups, rooms, services, requests, or entities.

14. The control device of claim 11, wherein the logical representations include UI zones.

15. The control device of claim 11, wherein the control device is a mobile device.

16. The control device of claim 11, wherein the control device is a remote control unit.

17. A machine-readable medium having instruction stored thereon, the instructions when executed by a processor being operable to:
- update a configuration database of a home automation system to a newer version, wherein the configuration database describes capabilities of, and interconnections between, devices present within a particular structure;
- in response to the update, query the configuration database for one or more room groups, rooms, services, requests, or entities;
- translate returned information from the configuration database related to the one or more room groups, rooms, services, requests, or entities to user interface (UI) elements using predefined mappings to automatically generate a custom UI; and
- display the UI elements in the custom UI operable by a user to control the home automation system.

18. The machine-readable medium of claim 17, wherein the instructions when executed are further operable to:
- build the configuration in response to input by an installer in a separate configuration application that provides a graphical programming environment.

19. The machine-readable medium of claim 17, wherein the instructions when executed are further operable to:
- generate a service implementation based on the configuration; and
- construct the configuration database by translating the service implementation.

20. The machine-readable medium of claim 17, wherein the custom UI is displayed on a remote control unit.

* * * * *